United States Patent
Tran et al.

(10) Patent No.: US 10,578,144 B2
(45) Date of Patent: Mar. 3, 2020

(54) IOT SENSOR

(71) Applicants: Bao Tran, Saratoga, CA (US); Ha Tran, Saratoga, CA (US)

(72) Inventors: Bao Tran, Saratoga, CA (US); Ha Tran, Saratoga, CA (US)

(*) Notice: Subject to any disclaimer, the term of this patent is extended or adjusted under 35 U.S.C. 154(b) by 0 days.

(21) Appl. No.: 16/385,066

(22) Filed: Apr. 16, 2019

(65) Prior Publication Data

US 2019/0309786 A1  Oct. 10, 2019

Related U.S. Application Data

(63) Continuation of application No. 15/947,795, filed on Apr. 7, 2018, now Pat. No. 10,309,438, which is a continuation of application No. 15/144,814, filed on May 3, 2016, now Pat. No. 9,964,134.

(51) Int. Cl.
  *G01L 5/24* (2006.01)
  *F16B 31/02* (2006.01)

(52) U.S. Cl.
  CPC .............. *F16B 31/025* (2013.01); *G01L 5/24* (2013.01)

(58) Field of Classification Search
  None
  See application file for complete search history.

(56) References Cited

U.S. PATENT DOCUMENTS

| | | | | |
|---|---|---|---|---|
| 5,237,516 A * | 8/1993 | Heyman | ................ | G01L 1/255 702/42 |
| 5,280,725 A * | 1/1994 | Stengel | ..................... | G01L 5/24 324/209 |
| 6,204,771 B1 * | 3/2001 | Ceney | ................... | F16B 31/025 250/559.19 |
| 8,391,561 B2 * | 3/2013 | Takman | .................. | F16B 31/02 29/407.01 |
| 8,521,448 B1 * | 8/2013 | Ung | ....................... | F16B 1/0071 702/42 |
| 8,540,468 B2 * | 9/2013 | Mekid | ..................... | F16B 31/02 411/13 |
| 8,683,869 B2 * | 4/2014 | Herley | .................... | F16B 31/02 73/760 |
| 9,402,115 B2 * | 7/2016 | Matsushita | .............. | H04Q 9/00 |
| 9,488,212 B2 * | 11/2016 | Hsieh | ..................... | F16B 35/00 |
| 9,645,061 B2 * | 5/2017 | Hsieh | ..................... | F16B 31/02 |
| 9,746,017 B2 * | 8/2017 | Ota | ........................ | F16B 35/00 |
| 9,897,127 B1 * | 2/2018 | Hershey | ................. | F16B 31/02 |
| 2018/0328797 A1 * | 11/2018 | Gwon | ....................... | G01L 1/10 |

FOREIGN PATENT DOCUMENTS

DE  19743699 A1 *  6/1998  ............. A47K 13/26

* cited by examiner

*Primary Examiner* — Natalie Huls
*Assistant Examiner* — Jermaine L Jenkins
(74) *Attorney, Agent, or Firm* — Tran & Associates

(57) ABSTRACT

An Internet of Thing (IoT) device includes a head portion; an elongated stress sensor coupled to the head portion, the stress sensor coupled to a surface; a processor coupled to the stress sensor; and a wireless transceiver coupled to the processor.

18 Claims, 5 Drawing Sheets

IOT SENSOR

BACKGROUND

The present invention relates to the Internet of Things ((IoT)).

SUMMARY

In one aspect, an Internet of Thing ((IoT)) device includes a head portion; an elongated stress sensor coupled to the head portion, the stress sensor coupled to a surface; a processor coupled to the stress sensor; and a wireless transceiver coupled to the processor.

Implementations may include one or more of the following. The system for smart bolts and probes is an electronic sensor for use with a smart bolt or probe having a sensor for detecting stress or tension. The smart lid includes a color sensor that provides electrical data corresponding to light received from the color indicator of the smart bolt or probe, a microcontroller that receives electrical data from the color sensor and converts that data to a digital form and compares the electrical data against at least one limit, and provides a digital indication wirelessly through an antenna to a remote monitor if the at least one limit has been exceeded. In this fashion a warning or emergency condition can be indicated when the tension experienced by the smart bolt is too low, or in some embodiments, too low or too high. The smart lid may include an electrical power source that scavenges electrical power from ambient electromagnetic fields (EMF) and stores the electrical power in a battery. Alternatively, the smart lid may be powered by a previously charged battery. The smart lid uses a housing that is removably coupled to the smart bolt with a flexible, resilient retainer.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

According to various embodiments of the present disclosure, an electronic device may include communication functionality. For example, an electronic device may be a smart phone, a tablet Personal Computer (PC), a mobile phone, a video phone, an e-book reader, a desktop PC, a laptop PC, a netbook PC, a Personal Digital Assistant (PDA), a Portable Multimedia Player (PMP), an MP3 player, a mobile medical device, a camera, a wearable device (e.g., a Head-Mounted Device (HMD), electronic clothes, electronic braces, an electronic necklace, an electronic accessory, an electronic tattoo, or a smart watch), and/or the like.

According to various embodiments of the present disclosure, an electronic device may be a smart home appliance with communication functionality. A smart home appliance may be, for example, a television, a Digital Video Disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., Magnetic Resonance Angiography (MRA) device, a Magnetic Resonance Imaging (MRI) device, Computed Tomography (CT) device, an imaging device, or an ultrasonic device), a navigation device, a Global Positioning System (GPS) receiver, an Event Data Recorder (EDR), a Flight Data Recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

In one embodiment, a smart bolt includes sensor(s) and wireless communication therein. The bolt can detect tension and communicate to a computer for storage and analysis. The smart bolt provides an automatic electronic process that eliminates the need for a manual inspection process, and uses electronic detection of stress, eliminating subjective human judgments and producing greater uniformity in maintenance, inspection, and emergency detection procedures.

Figure 1:
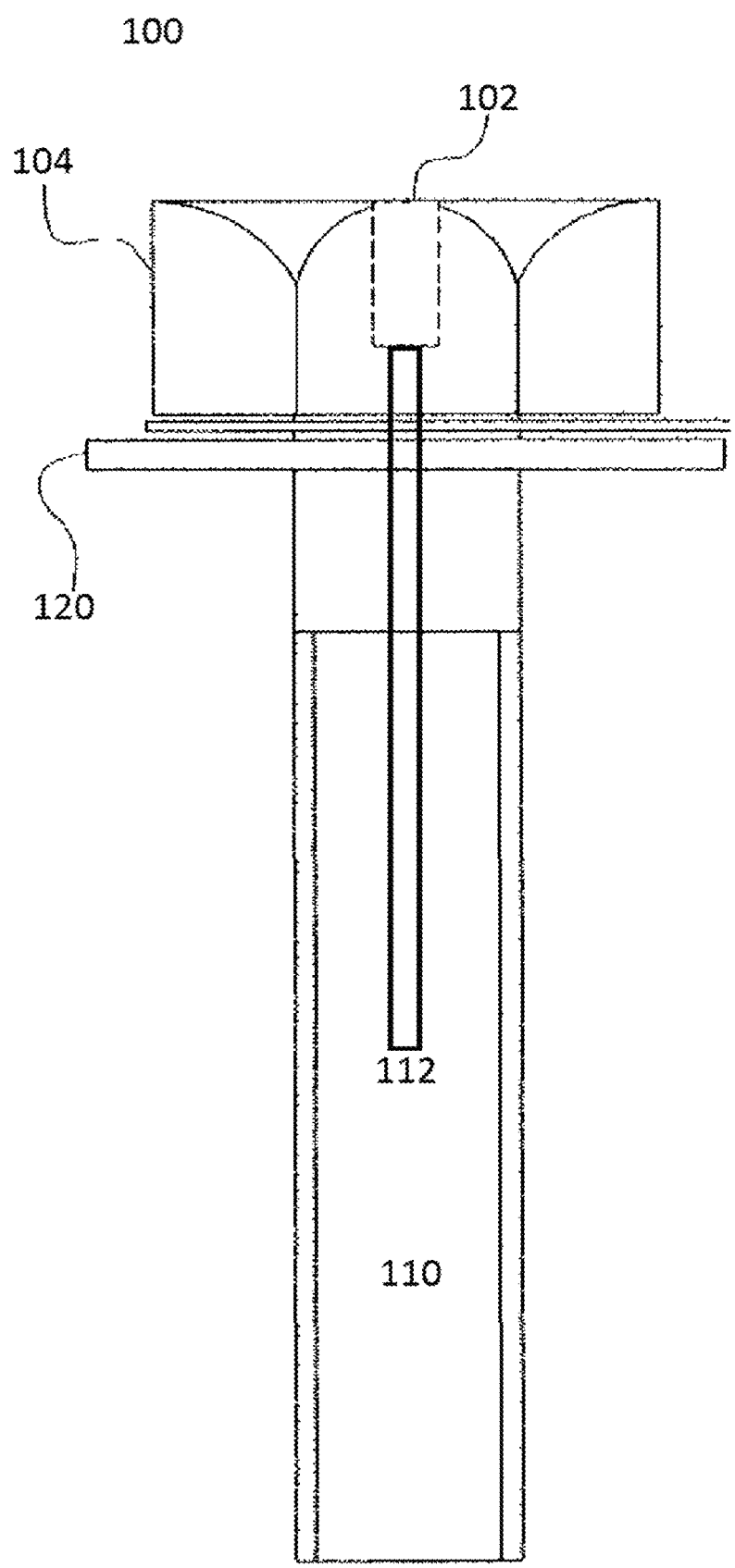
FIG. 1 is an side view of a smart bolt and probe according to the present invention.

FIG. 1 shows a smart bolt 100 with a head portion 104 and a threaded portion 110 positioned through an aperture of a washer 120. A stress sensor 112 is positioned in a core of the threaded portion 110. In one implementation, another stress sensor 114 is positioned adjacent the washer 120. Data generated by the sensors 112-114 is processed by electronics 102 in a recessed chamber. In one embodiment, a camera can be included with the electronics 102.

The unit 112 can include a camera, which can be a 360 degree camera. Alternatively, the camera can be a 3D camera such as the Kinect camera or the Intel RealSense camera for ease of generating 3D models and for detecting distance of objects. To reduce image processing load, each camera has a high performance GPU to perform local processing, and the processed images, sound, and odor data are uploaded to a cloud storage for subsequent analysis.

The unit 112 may include an electronic nose to detect odor. The electronic nose can simply be a MEMS device acting as a particle counter. An embodiment of the electronic nose can be used that includes a fan module, a gas molecule sensor module, a control unit and an output unit. The fan module is used to pump air actively to the gas molecule sensor module. The gas molecule sensor module detects the air pumped into by the fan module. The gas molecule sensor module at least includes a gas molecule sensor which is covered with a compound. The compound is used to combine preset gas molecules. The control unit controls the fan module to suck air into the electronic nose device. Then the fan module transmits an air current to the gas molecule sensor module to generate a detected data. The output unit calculates the detected data to generate a calculation result and outputs an indicating signal to an operator or compatible host computer according to the calculation result.

An electronic tongue sensor can be provided to sense quality of rain or liquid on the bolt. The tongue includes a liquid molecule sensor module, a control unit and an output unit. Rain or other liquid is received on to the liquid molecule sensor module. The molecule sensor module detects the liquid molecules pumped into by the stirring module. The liquid molecule sensor module at least includes a molecule sensor which is covered with a compound. The compound is used to combine preset liquid molecules. The control unit controls the stirring module to pump liquid to be "tasted" into the electronic tongue device. Then the module transmits a flow current to the liquid molecule sensor module to generate a detected data. The output unit calculates the detected data to generate a calculation result and outputs an indicating signal to an operator or compatible host computer according to the calculation result. Such electronic tongue can detect quality of fog or liquid, among others.

In one embodiment for analyzing a mechanical structure such as a building or bridge, the unit 112 includes a probe 20 which may be attached to a variety of sport probes, and instruments to afford adaptability to a variety of situations in providing diagnostic information on an object such as a naturally occurring structure, man-made materials placed or found within the structure, diseased or otherwise affected, infected or effected structure, as well as structure that has been eroded, worn by attrition, abraded, abfracted, fractured, crazed, broken or otherwise compromised through sport enthusiast use, misuse, fatigue or longevity of use. The probe 20 generates electrical outputs which are interpreted by a smart phone or computer.

In one embodiment, the probe 20 can be a vibratory transducer that sends out vibrations at known frequency and amplitude. The probe 20 also includes a receiver which can be an accelerometer, for example. The accelerometer is attached to the teeth and connected to a computer. The accelerometer digitizes the received vibrations and provides them into the phone or computer. The transducer can be a single piezoelectric transducer or an array with elements arranged to fit in a bolt cavity. The transducer elements can be mounted in silicone rubber or other material suitable for damping mechanical coupling between the elements. Other materials may also be used for the array construction. For example, the transducer may be formed from one or more pieces of piezocomposite material, or any material that converts electrical energy to acoustic energy. The receiver can also be positioned to fit in the mouthpiece or appliance. One embodiment of the receiver is an accelerometer, but a suitable piezoelectric transducer can serve as the receiver as well.

Figure 2A:
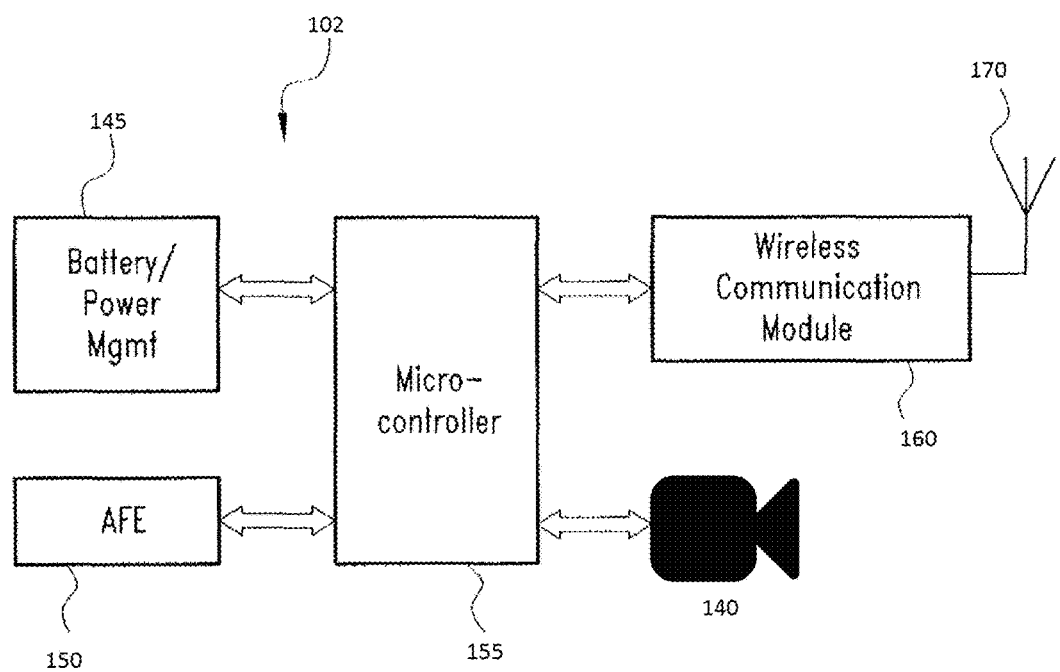
FIG. 2A is a block diagram of an electronic circuit for a smart bolt and probe according to the present invention.

As shown in FIG. 2A, a microcontroller 155 receives and processes signals from the sensor 112-114, and converts those signals into an appropriate digital electronic format. The microcontroller 155 wirelessly transmits tension information in the appropriate digital electronic format, which may be encoded or encrypted for secure communications, corresponding to the sensed stress indication through a wireless communication module or transceiver 160 and antenna 170. Optionally, a camera 140 can be provided to visually detect stress and movement of the structure. While monitoring of the smart bolt 100 stress is continuous, transmission of tension information can be continuous, periodic or event-driven, such as when the tension enters into a warning or emergency level. Typically the indicated tension enters a warning level, then an emergency level as tension drops below the optimal range, but corresponding warning and emergency levels above the optimal range can also be used if supported by the smart bolt 100. The microcontroller 155 is programmed with the appropriate warning and emergency levels, as well as internal damage diagnostics and self-recovery features.

The tension information can take any form, including a simple warning/emergency indication that the tension is approaching or exceeding tension specifications, respectively. While under-tension is known to be the primary cause of structural or mechanical problems associated with bolts, over-tension can also be a problem and can also be reported by the smart bolt 100.

The sensors can detect force, load, tension and compression forces on the device such as the bolt. Other data includes Acceleration; Velocity; Global absolute displacement; Local relative displacement; Rotation; Strain; Stress; Force; and Static-position video. Wind speed/direction; External temperature; weather parameters (rainfall, humidity, solar radiation, etc.); Internal or structural temperature; Mass loading (occupant count, etc.); Static tilt; Fatigue damage; Corrosion; Acoustic emission; and Moving-position video. A force is simply a push or pull to an object and can be detected by a load cell, pressure cell or strain sensor. A Load: Is simply a force applied to a structure. Ex: weight of vehicles or pedestrians, weight of wind pushing on sides. Tension & Compression are internal forces that make a member longer or shorter. Tension stretches a member and Compression pushes the member closer together. Acceleration can also be detected by Force-Balance (Servo) Piezoelectric Piezoresistive MEMS. Velocity can be measured by force-balance (servo) MEMS, or Mechanical Doppler Heated wire. A local Displacement sensor can be LVDT/ Cable potentiometer Acoustic Optical/laser Temperature Electrical Optical fiber. A rotation sensor can be Gyro MEMS Gyro Tilt Electro-mechanical MEMS. A strain sensor can be a resistance gauge Vibrating wire Optical fiber Corrosion Electrical Chemical sensors. A stress sensor can be a via strain gauge Direct Acoustic emission, or Piezoelectric MEMS, for example.

The sensor 112-114, transceiver 160/antenna 170, and microcontroller 155 are powered by and suitable power source, which may optionally include an electromagnetic field (EMF) scavenging device 145, such as those known in the art, that convert ambient EMF (such as that emitted by radio station broadcasts) into small amounts of electrical power. The EMF scavenging device 145 includes a battery to buffer and store energy for the microcontroller 155, sensor 112-114, camera 140 and wireless communications 160/170, among others.

The circuit of FIG. 2A contains an analog front-end ("AFE") transducer 150 for interfacing signals from the sensor 112-114 to the microcontroller 155. The AFE 150 electrically conditions the signals coming from the sensor 112-114 prior to their conversion by the microcontroller 155 so that the signals are electrically compatible with the specified input ranges of the microcontroller 155. The microcontroller 155 can have a CPU, memory and peripheral circuitry. The microcontroller 155 is electrically coupled to a wireless communication module 160 using either a standard or proprietary communication standard. Alternatively, the microcontroller 155 can include internally any or all circuitry of the smart bolt 100, including the wireless communication module 160. The microcontroller 155 preferably includes power savings or power management circuitry 145 and modes to reduce power consumption significantly when the microcontroller 155 is not active or is less active. The microcontroller 155 may contain at least one Analog-to-Digital Converter (ADC) channel for interfacing to the AFE 150.

The battery/power management module 145 preferably includes the electromagnetic field (EMF) scavenging device, but can alternatively run off of previously stored electrical power from the battery alone. The battery/power management module 145 powers all the circuitry in the smart bolt 100, including the camera 140, AFE 150, microcontroller 155, wireless communication module 160, and antenna 170. Even though the smart bolt 100 is preferably powered by continuously harvesting RF energy, it is beneficial to minimize power consumption. To minimize power consumption, the various tasks performed by the circuit should be repeated no more often than necessary under the circumstances.

Stress information from the smart bolt 100 and other information from the microcontroller 155 is preferably transmitted wirelessly through a wireless communication module 160 and antenna 170. As stated above, the wireless communication component can use standard or proprietary communication protocols. Smart lids 100 can also communicate with each other to relay information about the current status of the structure or machine and the smart bolt 100 themselves. In each smart bolt 100, the transmission of this information may be scheduled to be transmitted periodically. The smart lid 100 has a data storage medium (memory) to store data and internal status information, such as power levels, while the communication component is in an OFF state between transmission periods. On the other hand, once the communication commences in the ON state, the microcontroller 155 can execute the following tasks:

1. Neighbor discovery: in this task each smart bolt 100 sends a beacon identifying its location, capabilities (e.g. residual energy), status. 2. Cluster formation: cluster head will be elected based on the findings in (1). The cluster children communicate directly with their cluster head (CH). 3. Route discovery: this task interconnects the elected cluster heads together and finds the route towards the sink smart bolt (node) so that minimum energy is consumed. 4. Data transmission: the microcontroller processes the collected color data and based on the adopted data dissemination approach, the smart bolt 100 will do one of the following. (a) Transmit the data as is without considering the previous status; or (b) transmit the data considering the previous status. Here we can have several scenarios, which include: (i) transmitting the data if the change in reported tension exceeds the warning or emergency levels; and (ii) otherwise, do not transmit.

Figure 2B:
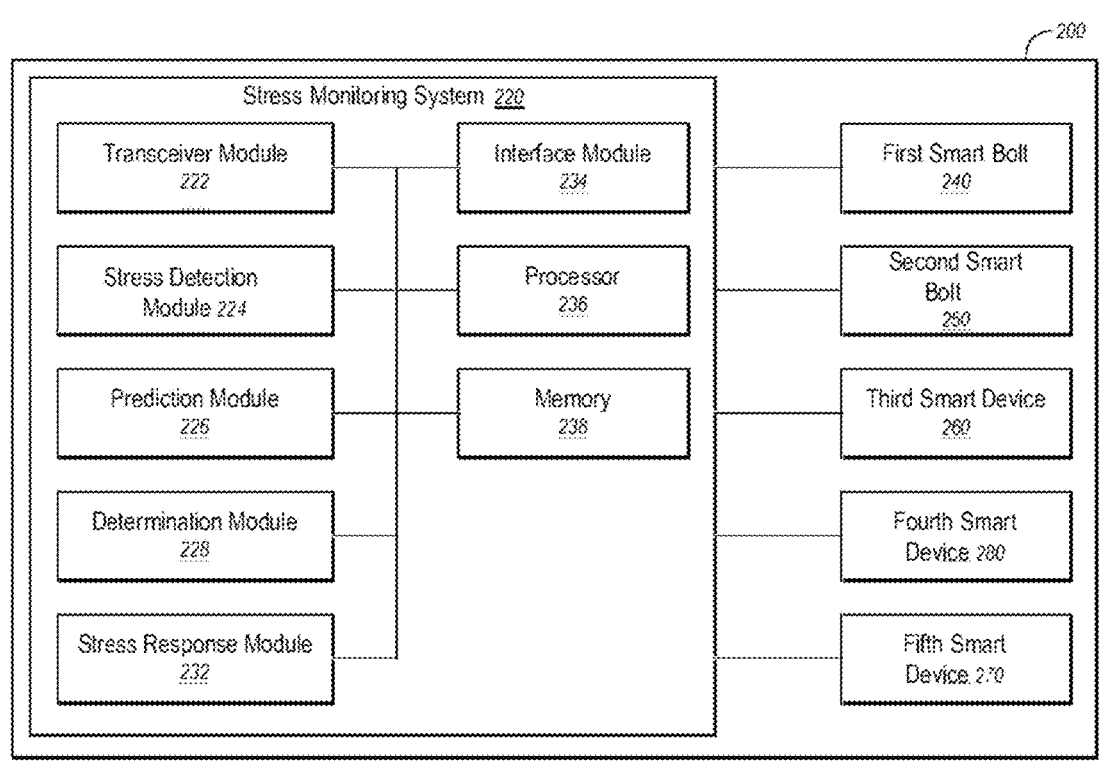
FIG. 2B is a block diagram of a big data system for predicting stress experienced by a structural unit such as a bridge, a building, or a plane, for example.

The bolt electronic of FIG. 2A operates with a big data discovery system of FIG. 2B that determines events that may lead to failure. FIG. 2B is a block diagram of an example stress monitoring system 200 that may be process the stress detected by the smart bolt 100 of FIG. 1, arranged in accordance with at least some embodiments described herein. Along with the stress monitoring system 220, a first smart device such as a smart bolt 240, a second smart device 250, a third smart device 260, a fourth smart device 280, and additional sensors 270 may also be associated with the unit 200. The stress monitoring system 220 may include, but is not limited to, a transceiver module 222, a stress detection module 224, a stress prediction module 226, a determination module 228, a stress response module 232, an interface module 234, a processor 236, and a memory 238.

The transceiver module 222 may be configured to receive a stress report from each of the first, second, and third smart devices 240, 250, 260. In some embodiments, the transceiver module 222 may be configured to receive the stress reports over a wireless network. For example, the transceiver module 222 and the first, second, and third smart devices 240, 250, 260 may be connected over a wireless network using the IEEE 802.11 or IEEE 802.15 standards, for example, among potentially other standards. Alternately or additionally, the transceiver module 222 and the first, second, and third smart devices 240, 250, 260 may communicate by sending communications over conductors used to carry electricity to the first, second, and third smart devices 240, 250, 260 and to other electrical devices in the unit 200. The transceiver module 222 may send the stress reports from the first, second, and third smart devices 240, 250, 260 to the prediction module 226, the stress detection module 224, and/or the determination module 228.

The stress module 224 may be configured to detect stress as detected by the bolts 100. The signal sent by the bolts 100 collectively may indicate the amount of stress being generated and/or a prediction of the amount of stress that will be generated. The stress detection module 224 may further be configured to detect a change in stress of non-smart devices associated with the unit 200.

The prediction module 226 may be configured to predict future stress based on past stress history as detected, environmental conditions, forecasted stress loads, among other factors. In some embodiments, the prediction module 226 may predict future stress by building models of usage and weight being transported. For example, the prediction module 226 may build models using machine learning based on support vector machines, artificial neural networks, or using other types of machine learning. For example, stress may correlate with the load carried by a bridge or an airplane structure. In other example, stress may correlate with temperature cycling when a structure is exposed to constant changes (such as that of an airplane).

The prediction module 226 may gather data for building the model to predict stress from multiple sources. Some of these sources may include, the first, second, and third smart devices 240, 250, 260; the stress detection module 224; networks, such as the World Wide Web; the interface module 234; among other sources. For example, the first, second, and third smart devices 240, 250, 260 may send information regarding human interactions with the first, second, and third smart devices 240, 250, 260. The human interactions with the first, second, and third smart devices 240, 250, 260 may indicate a pattern of usage for the first, second, and third smart devices 240, 250, 260 and/or other human behavior with respect to stress in the unit 200.

In some embodiments, the first, second, and third smart devices 240, 250, 260 may perform predictions for their own stress based on history and send their predicted stress in reports to the transceiver module 222. The prediction module 226 may use the stress reports along with the data of human interactions to predict stress for the system 200. Alternately or additionally, the prediction module 226 may make predictions of stress for the first, second, and third smart devices 240, 250, 260 based on data of human interactions and passed to the transceiver module 222 from the first, second, and third smart devices 240, 250, 260. A discussion of predicting stress for the first, second, and third smart devices 240, 250, 260 is provided below with respect to FIGS. 5 and 6.

The prediction module 224 may predict the stress for different amounts of time. For example, the prediction module 224 may predict stress of the system 200 for 1 hour, 2 hours, 12 hours, 1 day, or some other period. The prediction module 224 may also update a prediction at a set interval or when new data is available that changes the prediction. The prediction module 224 may send the predicted stress of the system 200 to the determination module 228. In some embodiments, the predicted stress of the system 200 may contain the entire stress of the system 200 and may incorporate or be based on stress reports from the first, second, and third smart devices 240, 250, 260. In other embodiments, the predicted stress of the system 200 may not incorporate or be based on the stress reports from the first, second, and third smart devices 240, 250, 260.

The determination module 228 may be configured to generate a unit stress report for the system 200. The determination module 228 may use the current stress of the system 200, the predicted stress of the system 200 received from the prediction module 224; stress reports from the first, second, and/or third smart devices 240, 250, 260, whether incorporated in the predicted stress of the system 200 or separate from the predicted stress of the system 200; and an amount of stress generated or the predicted amount of stress, to generate a unit stress report.

In some embodiments, one or more of the stress reports from the first, second, and/or third smart device 240, 250, 260 may contain an indication of the current operational profile and not stress. In these and other embodiments, the determination module 228 may be configured to determine the stress of a smart device for which the stress report indicates the current operational profile but not the stress. The determination module 228 may include the determined amount of stress for the smart device in the unit stress report. For example, both the first and second smart device 240, 250 may send stress report. The stress report from the first smart device 240 may indicate stress of the first smart device 240. The stress report from the second smart device 250 may indicate the current operational profile but not the stress of the second smart device 250. Based on the current operational profile of the second smart device 250, the determination module 228 may calculate the stress of the second smart device 250. The determination module 228 may then generate a unit stress report that contains the stress of both the first and second smart devices 240, 250.

In some embodiments, the stress monitoring system 220 may not include the prediction module 226. In these and other embodiments, the determination module 228 may use stress reports from the first, second, and/or third smart devices 240, 250, 260, with the received amount of stress inferred on non-smart devices, if any, to generate the unit stress report. The determination module 228 may send the unit stress report to the transceiver module 222.

In some embodiments, the processor 236 may be configured to execute computer instructions that cause the stress monitoring system 220 to perform the functions and operations described herein. The computer instructions may be loaded into the memory 238 for execution by the processor 236 and/or data generated, received, or operated on during performance of the functions and operations described herein may be at least temporarily stored in the memory 238.

Although the stress monitoring system 220 illustrates various discrete components, such as the prediction module 226 and the determination module 228, various components may be divided into additional components, combined into fewer components, or eliminated, depending on the desired implementation. In some embodiments, the unit 200 may be associated with more or less smart devices than the three smart devices 240, 250, 260 illustrated in FIG. 2.

Figure 3:
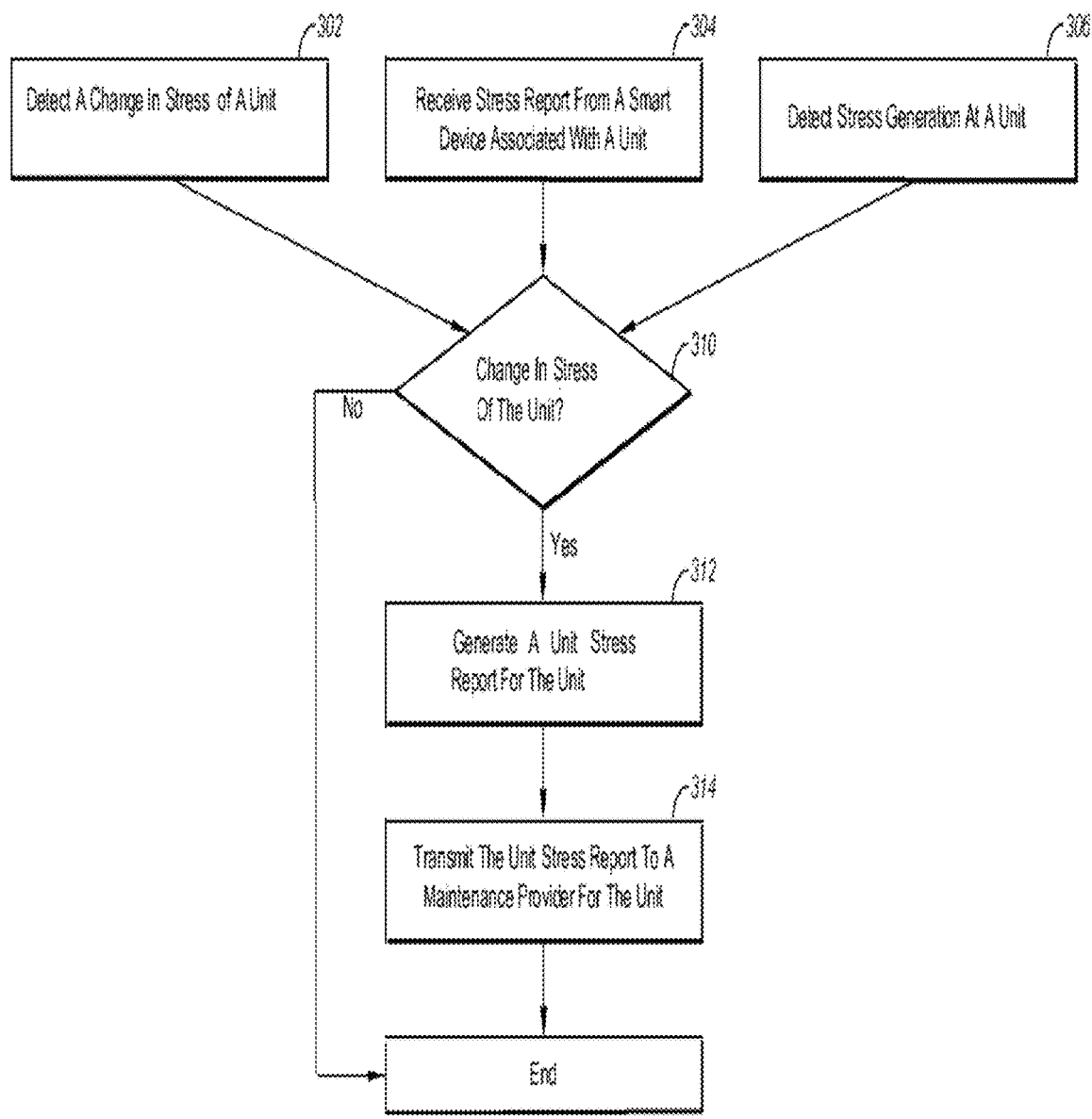
FIG. 3 is a flowchart illustrating one operation of the system of FIG. 2A-2B in detecting stress on a unit.

FIG. 3 is a flow chart of an example method 300 of monitoring stress of a unit, arranged in accordance with at least some embodiments described herein. The method 300 may be implemented, in some embodiments, by an stress monitoring system, such as the stress monitoring system 220 of FIG. 2. For instance, the processor 236 of FIG. 2B may be configured to execute computer instructions to perform operations for monitoring stress as represented by one or more of blocks 302, 304, 306, 310, 312, and/or 314 of the method 300. Although illustrated as discrete blocks, various blocks may be divided into additional blocks, combined into fewer blocks, or eliminated, depending on the desired implementation.

The method 300 may begin at one or more of blocks 302, 304, and/or 306. The blocks 302, 304, and/or 306 may occur at the same time or at different times and may or may not depend on one another. Furthermore, one or more of the block 302, 304, 306 may occur during the method 300. For example, the method 300 may complete when blocks 304, 310, and 312 occurs and without the occurrence of block 302 and 306.

In block 302, a change in stress of a device (bolt or beam) associated with a unit may be detected. A non-smart device may by any device that receives stress and does not generate an stress report indicating its stress. A change in the stress of a non-smart device may be detected using an stress detection module and/or usage meter associated with the unit, such as the stress detection module 224 and/or the smart bolt 100. For example, non-smart device stress can be estimated by the load the unit carries, the temperature cycling experienced by the unit, for example.

After a change in stress of the non-smart device is detected, the method 300 proceeds to block 310. In block 304, an stress report from a smart device such as the smart bolt 100 associated with the unit may be received. A smart device may be a device that detects stress and generates and transmits an stress report indicating the stress on the smart device. The stress report may indicate predicted future stress of the smart device. In some embodiments, an stress report may be received at set intervals from the smart device regardless of a change in the stress report. Alternately or additionally, a stress report may be received after a change in the stress of the smart device results in a change to the stress report. After a stress report is received from the smart device, the method 300 proceeds to block 310.

In block 306, stress experienced at the unit may be detected. Stress at the unit may be detected using a stress detection module, such as the stress detection module 224 of FIG. 2B. After detecting stress at the unit, the method proceeds to block 310. At block 310, it is determined if a change in the stress occurred. For example, if an increase in stress occurs at the same time and at the same amount as an increase in the stress of a non-smart device, a change in the stress may not occur. If a change in the stress occurs, the method 300 proceeds to block 312. If no change occurs, the method 300 ends.

At block 312, a unit stress report is generated for the unit. In some embodiments, the unit stress report may indicate the current stress of the unit. Alternately or additionally, the unit stress report may indicate a current and predicted future stress of the unit. At block 314, the unit stress report is transmitted to a maintenance provider. In some embodiments, the unit stress report may be transmitted when the unit stress report indicates a change in stress for the unit that is greater than a predetermined threshold. If the unit stress report indicates a change in stress for the unit that is less than the predetermined threshold, the unit stress report may not be transmitted to the provider of maintenance services.

Figure 4:
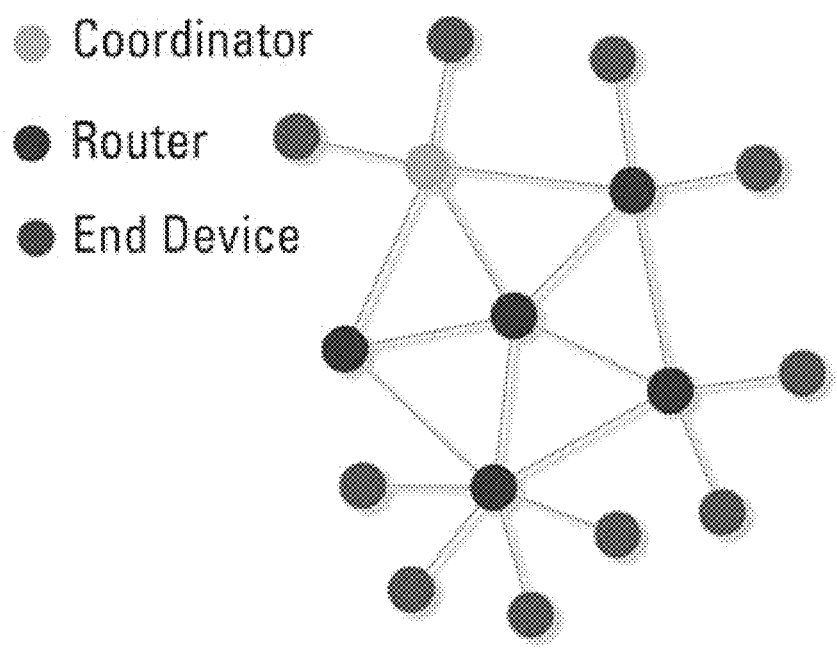
FIG. 4 shows an exemplary mesh network.

FIG. 4 shows an exemplary mesh network. In this embodiment, ZigBee is used. However, the mesh network can be formed using WiFi, Bluetooth, or any other suitable wireless area networks. ZigBee is a low-cost, low-power, wireless mesh network standard targeted at the wide development of long battery life devices in wireless control and monitoring applications. Zigbee devices have low latency, which further reduces average current. ZigBee chips are typically integrated with radios and with microcontrollers that have between 60-256 KB flashes memory. ZigBee operates in the industrial, scientific and medical (ISM) radio bands: 2.4 GHz in most jurisdictions worldwide; 784 MHz in China, 868 MHz in Europe and 915 MHz in the USA and Australia. Data rates vary from 20 kbit/s (868 MHz band) to 250 kbit/s (2.4 GHz band). The ZigBee network layer natively supports both star and tree networks, and generic mesh networking. Every network must have one coordinator device, tasked with its creation, the control of its parameters and basic maintenance. Within star networks, the coordinator must be the central node. Both trees and meshes allow the use of ZigBee routers to extend communication at the network level. ZigBee builds on the physical layer and media access control defined in IEEE standard 802.15.4 for low-rate WPANs. The specification includes four additional key components: network layer, application layer, ZigBee device objects (ZDOs) and manufacturer-defined application objects which allow for customization and favor total integration. ZDOs are responsible for some tasks, including keeping track of device roles, managing requests to join a network, as well as device discovery and security. ZigBee is one of the global standards of communication protocol formulated by the significant task force under the IEEE 802.15 working group. The fourth in the series, WPAN Low Rate/ZigBee is the newest and provides specifications for devices that have low data rates, consume very low power and are thus characterized by long battery life. Other standards like Bluetooth and IrDA address high data rate applications such as voice, video and LAN communications.

ZigBee devices are of three kinds: ZigBee Coordinator (ZC): The most capable device, the Coordinator forms the root of the network tree and might bridge to other networks. There is precisely one ZigBee Coordinator in each network since it is the device that started the network originally (the ZigBee LightLink specification also allows operation without a ZigBee Coordinator, making it more usable for over-the-shelf home products). It stores information about the network, including acting as the Trust Center & repository for security keys. ZigBee Router (ZR): As well as running an application function, a Router can act as an intermediate router, passing on data from other devices. ZigBee End Device (ZED): Contains just enough functionality to talk to the parent node (either the Coordinator or a Router); it cannot relay data from other devices. This relationship allows the node to be asleep a significant amount of the time thereby giving long battery life. A ZED requires the least amount of memory, and, therefore, can be less expensive to manufacture than a ZR or ZC. The current ZigBee protocols support beacon and non-beacon enabled networks. In non-beacon-enabled networks, an unspotted CSMA/CA channel access mechanism is used. In this type of network, ZigBee Routers typically have their receivers continuously active, requiring a more robust power supply. However, this allows for heterogeneous networks in which some devices receive continuously while others only transmit when an external stimulus is detected. The typical example of a heterogeneous network is a wireless light switch: The ZigBee node at the lamp may constantly receive, since it is connected to the mains supply, while a battery-powered light switch would remain asleep until the switch is thrown. The switch then wakes up, sends a command to the lamp, receives an acknowledgment, and returns to sleep. In such a network the lamp node will be at least a ZigBee Router, if not the ZigBee Coordinator; the switch node is typically a ZigBee End Device. In beacon-enabled networks, the special network nodes called ZigBee Routers transmit periodic beacons to confirm their presence to other network nodes. Nodes may sleep between beacons, thus lowering their duty cycle and extending their battery life. Beacon intervals depend on data rate; they may range from 15.36 milliseconds to 251.65824 seconds at 250 kbit/s, from 24 milliseconds to 393.216 seconds at 40 kbit/s and from 48 milliseconds to 786.432 seconds at 20 kbit/s. However, low duty cycle operation with long beacon intervals requires precise timing, which can conflict with the need for low product cost. In general, the ZigBee protocols minimize the time the radio is on, so as to reduce power use. In beaconing networks, nodes only need to be active while a beacon is being transmitted. In non-beacon-enabled networks, power consumption is decidedly asymmetrical: Some devices are always active while others spend most of their time sleeping. Except for the Smart Energy Profile 2.0, ZigBee devices are required to conform to the IEEE 802.15.4-2003 Low-Rate Wireless Personal Area Network (LR-WPAN) standard. The standard specifies the lower protocol layers—the physical layer (PHY), and the Media Access Control portion of the data link layer (DLL). The basic channel access mode is "carrier sense, multiple access/collision avoidance" (CSMA/CA). That is, the nodes talk in the same way that humans converse; they briefly check to see that no one is talking before he or she start, with three notable exceptions. Beacons are sent on a fixed timing schedule and do not use CSMA. Message acknowledgments also do not use CSMA. Finally, devices in beacon-enabled networks that have low latency real-time requirements may also use Guaranteed Time Slots (GTS), which by definition do not use CSMA.

Figure 5:
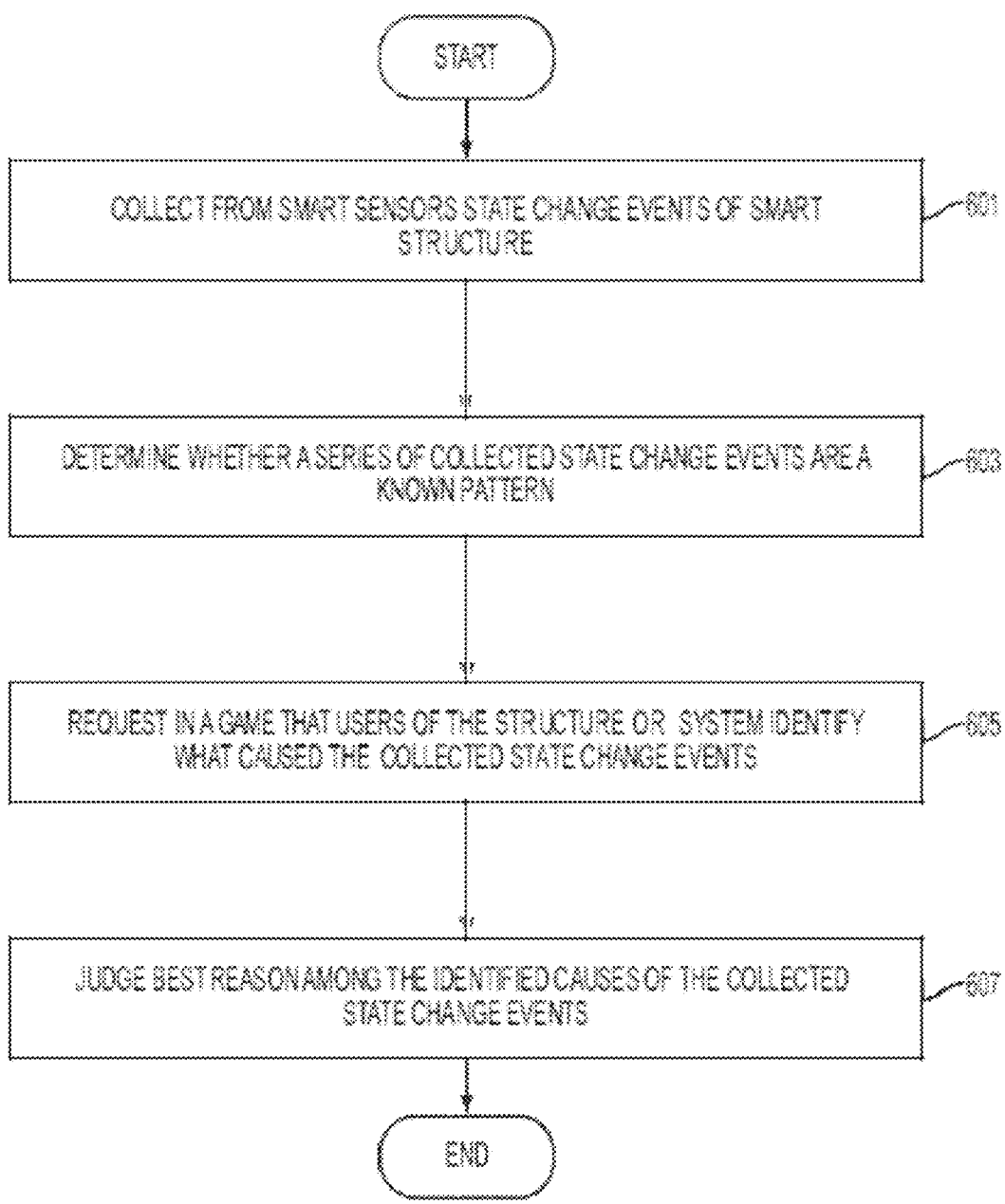
FIG. 5 shows an exemplary process to identify reasons for sensor data changes using a gaming process.

FIG. 5 is a flowchart of a method of an embodiment of the present disclosure. Referring to FIG. 6, a smart system may collect from smart devices state change events of a smart system in operation 601. That is, the smart system of FIG. 4 collects information on each of the group of devices, the smart bolts, the smart appliances, the security devices, the lighting devices, the energy devices, and the like. The state change events indicate when there is a change in the state of the device or the surrounding environment. The state change events are stored by the smart system. In operation 603, the system may determine whether a series of the collected state change events are a known pattern. That is, the gateway determines whether there are events which have been correlated or identified in the past. If the collected state change events have been identified in the past, it may be necessary to determine that the smart systems trusts the identification the collected state change events. The trust factor of the identification of the collected state change events may be determined by the number of users who have identified the collected state change events or the number of time collected state change events have been repeated and identified. In operation 605, when the series of the collected state change events is an unknown pattern, request users of the smart system to identify what caused the collected state change events request. That is, the system transmits to a gamification application (hereinafter app) on the user's mobile device a request to identify the collected state change events. The gamification app displays the information and request the user enter information identifying the collected state change events. Each of the mobile devices transmits this information back to the system to the gamification module. In operation 605, the system transmits the each user's identified collected state change events to the other user's of the smart home system and they each vote on the best identification of the collected state change events. Thus, the identified collected change state events that have been repeatedly identified over a period of weeks increases, the trustworthiness of the identification increases. Likewise, if every user of the smart system makes the same identification of the collected change state events, the identified collected change state events may be considered trustworthy at point. Such a determination of a threshold for when the identified collected change state events are considered trustworthy and therefore need not be repeated, is made by a system administrator. However, it will be understood that such a trustworthiness of this type only gives higher confidence of this particular dataset at that point in time. As such further repetition is required, since the sensor data may have noise, the more datasets to be identified to the pattern, the more robust the trustworthiness will be. Until the robustness reaches a threshold, then the system can confirm this is a known trustworthy pattern.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

The embodiments described herein may include the use of a special purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include tangible computer-readable storage media including RAM, ROM, EEPROM, CD-ROM or other optical disk storage, magnetic disk storage or other magnetic storage devices, or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" may refer to software objects or routines that execute on the computing system. The different components, modules, engines, and services described herein may be implemented as objects or processes that execute on the computing system (e.g., as separate threads). While the system and methods described herein may be preferably implemented in software, implementations in hardware or a combination of software and hardware are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A device, comprising:
   a head portion;
   an elongated body;
   a sensor coupled to the head portion, the sensor coupled to a surface of the elongated body;
   a vibrator in the elongated body that vibrates at one or more patterns each with a selected frequency and amplitude;
   a processor coupled to the sensor and the vibrator; and
   a wireless transceiver coupled to the processor.

2. The device of claim 1, wherein the elongated body encloses the sensor.

3. The device of claim 1, comprising a camera coupled to a graphical processing unit (GPU) and wirelessly coupled to the processor.

4. The device of claim 1, comprising code to provide sensor data to communicate sensor data with one or more remote persons.

5. The device of claim 1, comprising a camera coupled to the processor.

6. The device of claim 1, comprising an electronic nose or electronic tongue coupled to the processor.

7. The device of claim 1, comprising a cloud based image processing system running code to receive images from a camera and code to recognize an image.

8. The device of claim 1, comprising a wireless mesh network coupled to the wireless transceiver to transfer data from node to node.

9. The device of claim 1, comprising a tongue coupled to the head.

10. The device of claim 1, comprising an energy scavenging unit, a piezoelectric transducer, a solar cell, or a wireless energy capture unit to supply power to the processor.

11. The device of claim 1, comprising code to analyze and predict stress or vibration impact.

12. The device of claim 1, comprising code to perform gaming based on vibration.

13. A system, comprising:
    a mesh network; and one or more devices, each device having a head portion, a sensor in an elongated body of the device, a vibrator in the elongated body that vibrates at one or more patterns each with a selected frequency and amplitude, a processor in the elongated body coupled to the sensor and the vibrator, and a wireless transceiver in the elongated body coupled to the mesh network.

14. The system of claim 13, wherein the sensor is coupled to a surface to detect stress or vibration associated with the surface.

15. The system of claim 13, comprising a camera in the elongated body and coupled to the processor.

16. The system of claim 15, wherein the camera is coupled to a graphical processing unit (GPU).

17. The system of claim 15, comprising a cloud based image processing system running code to receive images from the camera and code to recognize an image.

18. The system of claim 13, wherein the sensor detects motion.

* * * * *